UNITED STATES PATENT OFFICE.

ALFRED O. TATE, OF NEW YORK, N. Y.

WATERPROOFING SUBSTANCE FOR FIBROUS MATERIAL.

1,400,579. Specification of Letters Patent. Patented Dec. 20, 1921.

No Drawing. Application filed January 24, 1920. Serial No. 353,901.

*To all whom it may concern:*

Be it known that I, ALFRED O. TATE, a subject of the King of Great Britain, residing in the borough of Manhattan, city, county, and State of New York, have invented certain new and useful Improvements in Waterproofing Substances for Fibrous Material, of which the following is a description.

My invention relates to a composition of matter for treating fibrous materials, such as paper and cloth or articles made therefrom.

The principal object of my invention is to provide a composition of matter which may be readily and cheaply applied to fibrous materials, especially cloth or articles made therefrom and which will render the same substantially waterproof.

The novel features of my invention are particularly pointed out in the appended claims. My invention itself, however, together with further objects and advantages, will best be understood by reference to the following description.

My composition of matter comprises as a base a mineral-containing substance which is insoluble in water, held in solution in a volatile solvent. Such base or substance insoluble in water may be an alumina soap and I prefer to use for this purpose aluminum palmitate which I prepare preferably by reacting on a good grade of white castile soap with a solution of aluminum sulfate or aluminum acetate. However, I do not limit myself to the use as base substances to aluminum-containing substances or to soaps, all compounds containing a metal and a radical of an organic acid and which are insoluble in water, soluble in a volatile solvent, and adhere to the fabric when deposited thereon from solution, being suitable bases. I prefer, however, to use as a base a substance which when applied to a cloth in moderate quantities improves its texture. I find that aluminum palmitate does this as well as forms a somewhat gelatinous adhesive layer or coating on the cloth or material to which it is applied and, the aluminum palmitate being insoluble in water, the material is thus effectually waterproofed.

Any one of a variety of solvents may be used for dissolving the water insoluble base, such as aluminum palmitate, but any substance used for this purpose is preferably quite volatile so that the dressing may dry on the cloth shortly after being applied thereto. Moreover, the solvent should not leave any stain on the cloth to which the dressing is applied or otherwise damage the same. I have used both gasolene and carbon tetrachlorid as solvents in my composition of matter with good results, and I find in general that volatile fluid hydrocarbons or hydrocarbon substitution products may be used as solvents when the base is a metallic soap.

I find in actual use that the base substance such as aluminum soap becomes friable after the solvent has been thoroughly volatilized and the layer or film of base material is consequently rapidly dispersed by ordinary friction. I therefore add to the solution of the base material in the volatile solvent a quantity of a binding agent such as albumen, gum arabic, or gum tragacanth, or the like, preferably of transparent character, to give a greater pliability and strength, as well as greater body, to the deposited material.

The albumen or gum serves as a thickening agent while the dressing is still liquid, lessening the amount of penetration of the fabric which occurs to an objectionable extent unless the albumen or equivalent is used. The albumen or the like hence serves not only as binding agent when the dressing has dried, but as a penetration preventer or lessener while the waterproofing composition is liquid.

I find it desirable, also, to add to the solution before application to the cloth or other article, such as canvas shoes, a quantity of a substance such as zinc oxid, French chalk, pipe clay or whiting, which also is water repellent, as well as insoluble.

In case it is desired to produce a colored dressing, I may mix into it compounds of different metals, such as oxid of iron to produce brown, or carbonate of copper for green. I may also use direct coloring substances such as dies in combination with the white oxid of zinc to give it the desired color.

It will be seen that my invention provides a simple and inexpensive means whereby the wearing qualities of cloth may be improved by rendering the same substantially waterproof and whereby at the same time the texture of the cloth may be improved, while it also provides a vehicle whereby the color may be renewed or modified as desired.

Having described my invention, I claim:

1. A waterproofing composition for fibrous material comprising a metal salt of an organic acid which is insoluble in water and adherent to fabric when deposited thereon from solution, a solvent for said salt which is volatile and which does not of itself stain fabric, and albumen.

2. A waterproofing composition for fibrous material comprising a metal salt of an organic acid which is insoluble in water and adherent to fabric when deposited thereon from solution, albumen, zinc oxid, and a solvent for said salt which is volatile and which does not of itself stain fabric.

3. A waterproofing composition for fibrous material comprising an aluminum soap, albumen, zinc oxid, and a solvent for said soap which is volatile and which does not of itself stain fabric.

ALFRED O. TATE.